June 24, 1969     A. J. WILLIAMS, JR     3,452,361

INK SUPPLY FOR CAPILLARY PEN

Filed Dec. 22, 1967

3,452,361
INK SUPPLY FOR CAPILLARY PEN
Albert J. Williams, Jr., Philadelphia, Pa., assignor to Leeds & Northrup Company, Philadelphia, Pa., a corporation of Pennsylvania
Filed Dec. 22, 1967, Ser. No. 692,813
Int. Cl. G01d 15/16, 15/18
U.S. Cl. 346—140                     2 Claims

ABSTRACT OF THE DISCLOSURE

A capillary inking system for a recorder wherein the ink storage container is automatically changed in elevation as the ink supply is used, thereby to maintain the level of the ink in the container at approximately the same level or at a constant difference level from the level of the writing tip of the capillary pen, in order to prevent flooding or skipping.

Background of the invention

For many years there have been available on the market capillary pen systems for recording apparatus in which a bottle, a sack, a flask, or other type of ink storage container, has been secured to the wall of the recorder case, or some other portion of the recorder, and connected by means of a flexible capillary tube to a capillary pen constructed and arranged for movement over a chart to make a record thereon. It has been pointed out in an article by Claude B. Nolte, entitled, "Marking Systems," Instruments & Control Systems, May 1965, pages 157–161, that "Depending on the surface tension characteristics of the ink and the diameter of the bore in the pen tube, the ink can be lifted from two inches to five inches above the level in the reservoir." In United States Patent No. 3,149,904, it is indicated that for fast writing, capillary rise at sea level for capillary systems of the type described is found to be limited to less than one inch of elevation above the level of the ink in a reservoir or ink storage container. Applicant has discovered that the distance of the point of the capillary pen above the level of the ink in an ink storage container must be materially less than one inch to insure clear ink marking without skipping when a capillary pen, of the type described, is recording rapidly with movements back and forth across the chart in a manner frequently referred to by those skilled in the art as an "active pen."

Summary of the invention

In accordance with the present invention, applicant provides an inking system useful in graphic recorders. This inking system is of the type including a capillary pen having a point for marking a recorder chart, an ink storage container, and a flexible capillary tube for conveying ink from the storage container to the capillary pen; characterized by the provision of means automatically to maintain the level of the ink in the storage container at approximately the same level as the writing point of the capillary pen. By maintaining the ink level at or slightly below the level of the point of the capillary pen, the hydrostatic head on the ink is maintained substantially constant, flooding of the pen is avoided and likewise, skipping is avoided when the pen is recording at high rates of speed.

In a preferred embodiment of applicant's invention, the ink storage container is supported with respect to the frame or case of the recorder by a spring of appropriate spring constant thereby automatically to elevate the ink storage container as the weight of the ink is being reduced during use, thus maintaining the absolute level of the top surface of the ink, and thereby the hydrostatic head, approximately constant.

Brief description of the drawings

For a more detailed understanding of the invention, reference is made in the following description of preferred embodiments thereof to the accompanying drawings in which.

Description of the preferred embodiment

Figure 1:
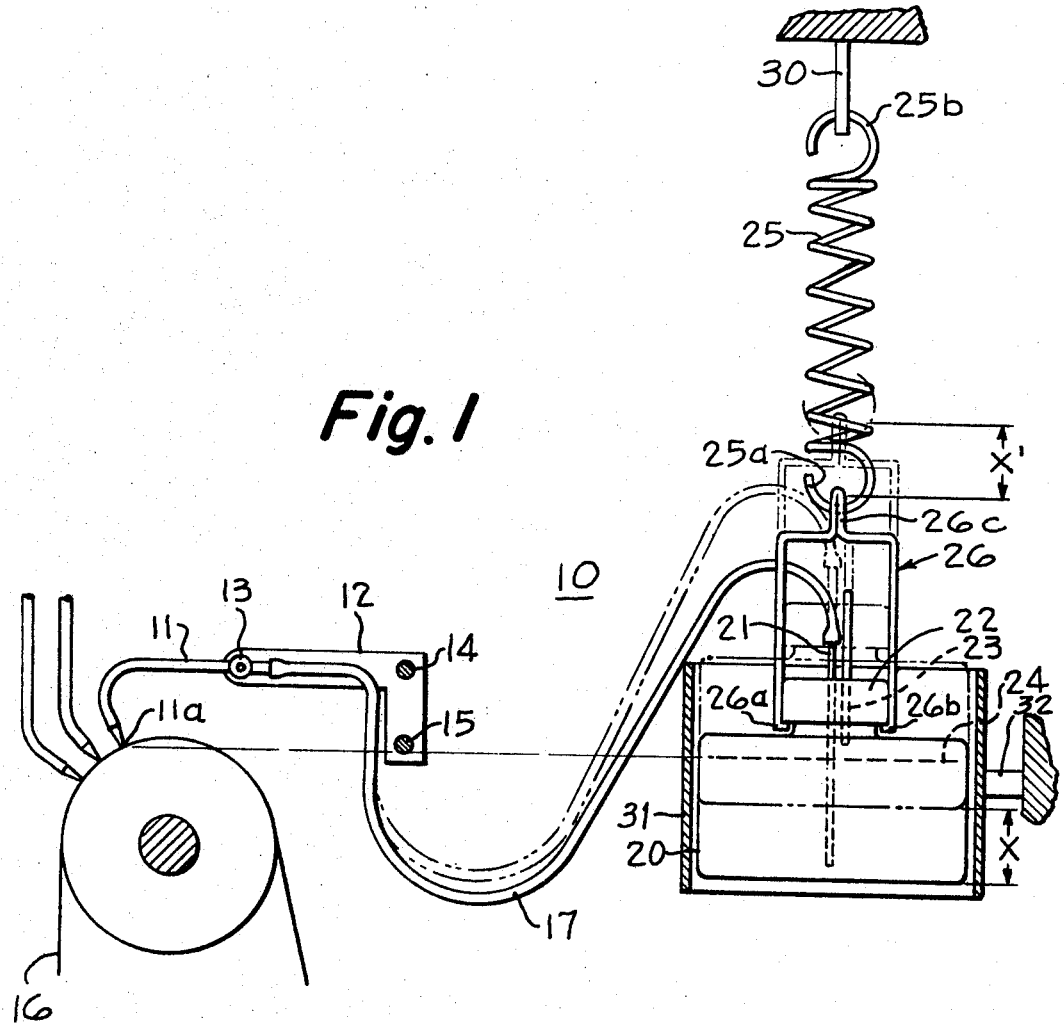
FIG. 1 is a side elevation view diagrammatically indicating the relationship between an ink storage container and the writing point of a capillary pen in accordance with the invention.

Referring to FIG. 1 there is indicated a capillary pen system 10 suitable for use with most any type of graphic recorder. In the embodiment shown, a capillary pen 11 is supported in a pen carriage 12 by a pivot member 13. The pen carriage 12 is mounted on guide rods 14 and 15 for movement across a chart 16 of a strip chart recorder (not shown) by means well known to those skilled in the art. The capillary pen 11 is connected by a flexible capillary tubing 17 to an ink storage container 20. The ink storage container 20 may be a bottle of ink, a sack made of collapsible plastic, or any of many ink storage containers which are well known in the art. The ink container 20, as illustrated, may be a bottle of translucent, resilient plastic having a supply pipe 21 which extends from a point near the bottom of the bottle through the closure cap 22 to provide a point of connection with capillary 17. The closure cap 22 is generally provided with venting means such as a short length of pipe 23. In this type of apparatus, when the capillary system is placed in use, an operator closes off the vent pipe 23 with a finger and squeezes the bottle 20 to prime the pen.

In accordance with the present invention, the level 24 of the ink in the bottle 20 is automatically maintained substantially at or slightly below the level of the writing point 11a of the capillary pen 11 by supporting the bottle 20 by means of a spring 25. As illustrated, an inverted U-shaped hanger member 26 has a pair of inwardly turned lips 26a and 26b which engage and thereby support the screw cap 22 of the bottle 20. The hanger 26 has an upwardly extending portion 26c having a hole therethrough to receive an end 25a of spring 25. The upper end 25b of spring 25 is hooked through a hole in a supporting member 30 which may be secured to some portion of the recorder or recorder case (not shown).

The spring 25, shown in FIG. 1, provides a means responsive to the amount of ink in the storage container 20 automatically to effect movement of the ink storage container in a direction tending to maintain the level 24 of the ink in a preselected relation to the level of the point 11a of the capillary pen 11. It is believed clearly evident from FIG. 1 that as the ink is used and the level 24 tends to fall, the bottle becomes lighter in weight and it is automatically raised by means of the spring 25 which acts as a weighing scale.

In order that the level 24 remain constant, there is illustrated by means of phantom lines the new position of the parts when the ink in the container 20 is used by an amount such that the bottle is only about one-quarter full instead of three-quarters full, as shown in solid lines. As may be noted, when the ink storage container 20 is only one-quarter full, it will have moved up the distance X, since the hanger member 26 is pulled up the same amount by spring 25, as indicated by the distance X'.

In the embodiment illustrated in FIG. 1, a tube 31, in which the ink storage container 20 fits loosely, is shown supported by support means 32 affixed to a suitable portion of the recorder or its case. The tube 31 or equivalent means may desirably be provided to prevent undesirable lateral motion of the ink bottle 20.

Figure 2:
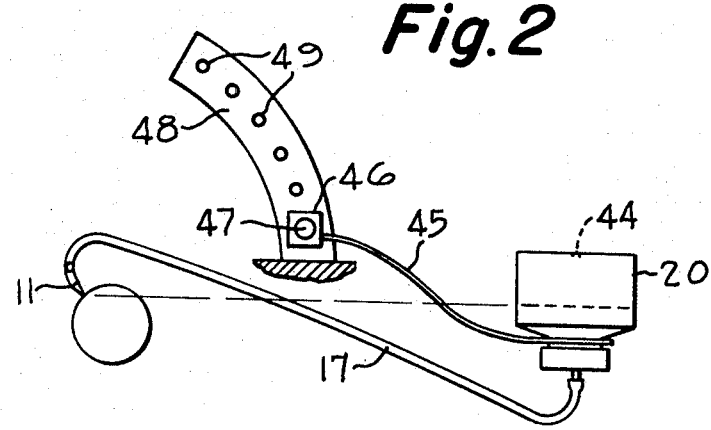
FIG. 2 is a side elevation view of a modification of the invention disclosed in FIG. 1.

In FIG. 2 there is illustrated a modification of the invention shown in FIG. 1. In the modification of FIG. 2, corresponding parts have been given like reference numerals and only those parts believed necessary have been shown. In this modification, the ink bottle 20 is shown inverted and supported in a bifurcated end of a cantilever spring 45 having its other end secured in a block 46 which may be mounted by means of a screw 47 employed to fasten the block 46 to mounting means 48 which may be made a part of the recorder chassis, case, door, or the like. Mounting means 48 may desirably include a plurality of mounting locations, such as tapped holes 49, any of which may be selected should it be desired to tilt the recording instrument to a position other than that which is characteristic of the usual panel mounted instrument. In the modification illustrated in FIG. 2, when the spring 45 is made of a single element of wire such as piano wire having the desired length and cross-sectional area in order to provide the desired spring rate for a cylindrical bottle such as 20, it will be desirable to provide means such as the tube 31 of FIG. 1 to prevent undesired lateral movement of the bottle 20. When the spring 45 is made of strip material having suitable width, then no such lateral movement restricting element will be needed. In order to vent the ink bottle 20 in the inverted position, a pin hole 44 may be punched in the bottom as indicated.

In describing the invention utilizing spring means by way of example, it should be clearly understood that a spring such as 25 or 45 will be designed in accordance with the specific gravity of the ink and the shape of the ink container. For containers having a uniform cross-sectional area, the spring rate will be substantially linear; however, should the ink container be, for example, pear-shaped or some other shape wherein the cross-sectional area of the container changes in the direction of change of ink level, the spring rate will have to be calculated accordingly in order to maintain the level of the ink in the container substantially constant. While spring means have been described as a means suitable for automatically effecting the movement of the ink storage container to maintain the level of the ink in the container in a preselected relation to the level of the writing point of the capillary pen, it is to be understood that other means may be utilized automatically to effect movement of the storage container.

Such other automatic means in one form may comprise a level sensing device controlling operation of a motor to reposition the ink storage container. It is also to be understood that details of the capillary pen, the capillary tube, and/or the ink storage container per se form no part of the present invention and the invention lends itself to use in any combination of these items.

What is claimed is:

1. An inking system for a recorder including a capillary pen having a point for marking a chart, an ink storage container, and a flexible capillary tube for conveying ink from said storage container to said capillary pen; characterized by the provision of a cantilever spring supporting said ink storage container and thereby responsive to the amount of ink in said storage container, said spring having an appropriate spring constant automatically to effect movement of said storage container in a direction tending to maintain the level of the ink in said storage container in a preselected relation to the level of said point for marking a chart and raise said storage container to maintain said level of the ink as said ink is used.

2. An inking system for a recorder including a capillary pen having a point for marking a chart, an ink storage container, and a flexible capillary tube for conveying ink from said storage container to said capillary pen; characterized by the provision of a spring supporting said ink storage container and thereby automatically to effect movement of said storage container in a direction tending to maintain the level of the ink in said storage container in a preselected relation to the level of said point for marking a chart and raise said storage container to maintain said level of the ink as said ink is used, and wherein a mounting for one end of said spring is adjustable for tilt of a recorder case in which said inking system is mounted.

References Cited

UNITED STATES PATENTS 2,176,777  10/1939  Tate _____ 346—140
2,771,878  11/1956  Folland et al. _____ 222—58 X RICHARD B. WILKINSON, *Primary Examiner.*

JOSEPH W. HARTARY, *Assistant Examiner.*

U.S. Cl. X.R.

137—408, 222—58